Patented Feb. 12, 1924.

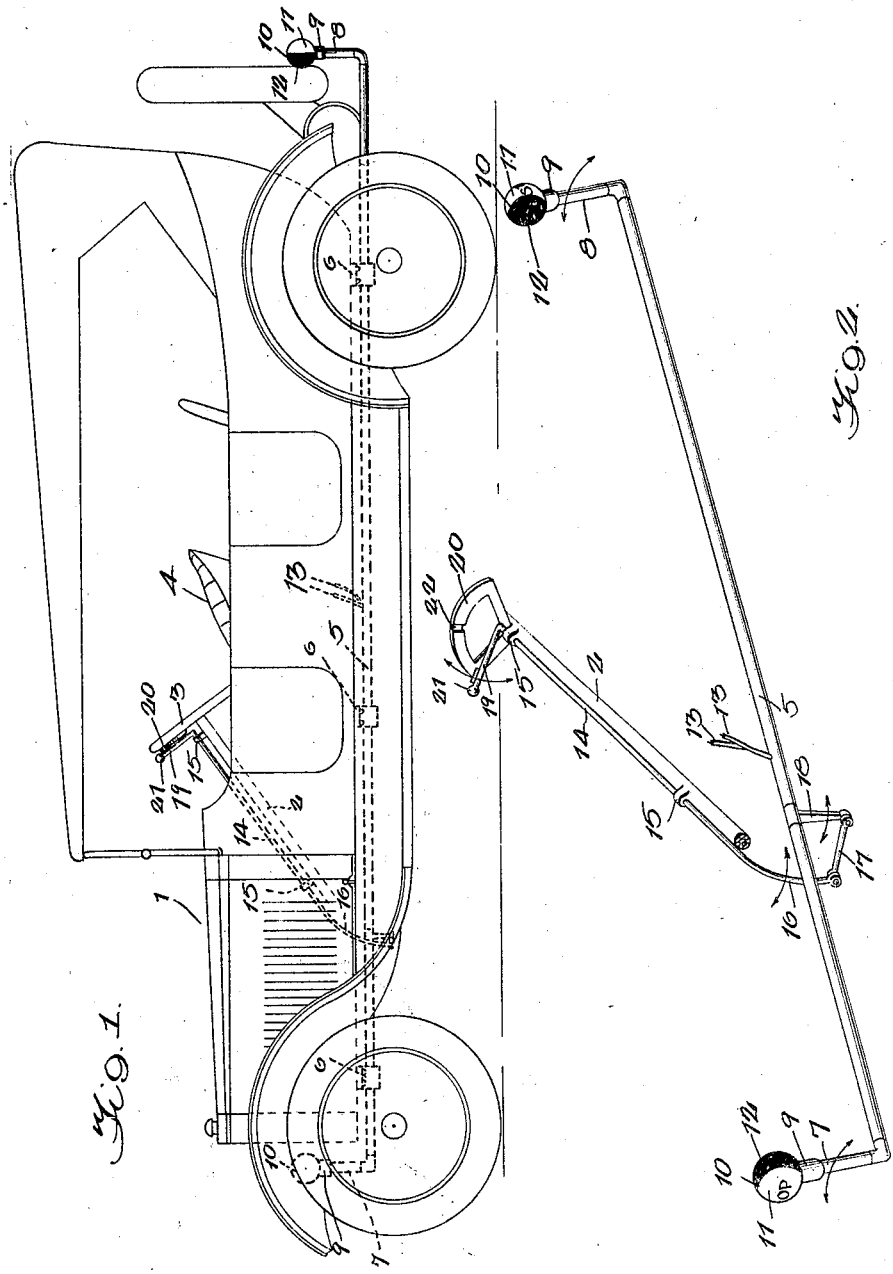
Feb. 12, 1924.
D. A. RITCHIE
SIGNALING DEVICE FOR VEHICLES
Filed Dec. 4, 1922
1,483,615

1,483,615

UNITED STATES PATENT OFFICE.

DAVID ALEXANDER RITCHIE, OF CENTRALIA, ILLINOIS.

SIGNALING DEVICE FOR VEHICLES.

Application filed December 4, 1922. Serial No. 604,931.

*To all whom it may concern:*

Be it known that I, DAVID A. RITCHIE, a citizen of the United States, and a resident of Centralia, in the county of Marion and State of Illinois, have made certain new and useful Improvements in Signaling Devices for Vehicles, of which the following is a specification.

My invention relates to signaling devices for vehicles and it consists in the combinations, constructions and arrangements herein described and claimed.

An object of the invention is to provide a signaling device of simplified construction, which is adapted to be attached to automobiles and like vehicles without any extensive changes, if any, being required in the construction of the latter, and which is adapted to be operated by the driver of the vehicle to which applied to indicate to approaching and following pedestrians and motorists the intentions of the driver of the vehicle so far as the further movements of the vehicle are concerned.

A further object of the invention is to provide a device of the character described which is adapted to be applied to a vehicle to provide signal means at the front and back of the vehicle, which means are adapted to be operated simultaneously by the driver of the vehicle without interfering in any way with the operation of the vehicle in the usual manner.

A still further object of the invention is to provide a device of the character described which is economical to manufacture, easy of operation, and which is thoroughly practical commercially.

Other objects and advantages will be apparent from the following description considered in conjunction with the accompanying drawing in which:—

Figure 1 is a side elevation of an automobile equipped with a practical embodiment of my invention, and, Figure 2 is a perspective view showing the embodiment of the invention associated with a fragmentary portion of the steering column of the automobile.

In the drawings, 1 denotes an automobile of any usual or preferred type of construction. The automobile is provided with the usual steering column 2 carrying a steering wheel 3 operable from the driver's seat 4.

In carrying out the invention, I provide a hollow shaft 5 which is shown as being a tube and which is rotatably supported by a plurality of spaced apart brackets 6 attached to the frame or body of the automobile so that the ends of the hollow shaft 5 project beyond the front and rear ends of the automobile body. The hollow shaft 5 is provided at its opposite ends with similar signal arms 7 and 8 respectively, which may be end portions of the hollow shaft and which extend in the same direction from the longitudinal axis of the hollow shaft and preferably at right angles to the latter. The respective signal arms 7 and 8 are thus positioned at the front and rear ends of the automobile and each is fashioned at its extremity to provide a socket 9 for the reception of the base of an incandescent lamp 10. Each incandescent lamp 10 preferably has the hemispherical portion of the globe thereof remote from the vehicle formed of clear glass or like transparent material as indicated at 11, while the hemispherical portion of the globe proximate to the vehicle is colored or formed of some material which renders it conspicuous, as indicated at 12, and provides a back ground for the light emitting element of the incandescent lamp. The hemispherical portions 11 of the globes of the incandescent lamps may have signal giving indicia produced thereon.

Electrical conductors 13 lead from the incandescent lamps through the tubular shaft 5 to a desirable point and are then conducted through an aperture in the side of the tubular shaft for connection with any suitable source of electric current supply, not shown, as for instance to the lighting circuit of the automobile.

The tubular shaft 5 may be rocked to position the signal arms 7 and 8 in various signal giving positions by means readily operable by the driver of the automobile. Such means include an operating rod 14 having a straight intermediate portion journaled in bearings 15 provided on the steering column. The operating rod 14 has a curved lower end portion indicated at 16, which is connected by a link 17 to a rocker arm 18 carried by the tubular shaft 5. The upper end portion 19 of the operating rod 14 extends laterally of the straight intermediate portion thereof in proximity to the lower face of a sector shaped latch plate 20, which is supported on the steering column 2 close to the steering wheel 3. The laterally turned upper end portion 19 of the operating rod thus constitutes a handle and has the extremity thereof slightly enlarged and rounded as indicated at 21 so that it is adapted to be conveniently manipulated by the fingers of a hand grasping the steering wheel. The handle 19 is adapted to engage with a notch 22 on the lower face of the latch plate to releasably hold the handle in a determined position in respect to the latch plate.

From the foregoing description of the various parts of the device the operation thereof may be readily understood. When the handle 19 is engaged with the notch 22 on the latch plate, the hollow shaft 5 will be held in such position that the signal arms 7 and 8 will extend upwardly from the axis of the hollow shaft. When the driver of the automobile intends to turn to the left, the handle 19 is manipulated so as to swing the signal arms 7 and 8 outwardly or to the left and to thereby indicate to persons approaching or following the automobile of the intention of the driver. Likewise, when the driver of the automobile contemplates turning to the right, the handle 19 is manipulated to effect swinging movement of the signal arms 7 and 8 to the right. In upright position the signal arms may indicate the intention of the driver to proceed straight ahead and if desired the handle 19 may be manipulated to cause the signal arms 7 and 8 to be swung downwardly from the axis of the hollow shaft to thus give a certain signal to interested persons, as for instance, to indicate the intention of the driver of the automobile to stop the latter.

The device is adapted for use both during the day and at night. During the day, the swinging movements of the signal arms will direct the attention of interested persons thereto and the conspicuous colors of portion of the globe of the incandescent lamps and the signal giving indicia produced thereon will aid in evidencing the intention of the driver of the automobile. At night, the incandescent lamps are energized by current supplied to the conductors 13 and will be at once observed by interested persons.

The device is extremely simple in construction and constitutes a highly efficient means for giving desired signals with the necessity of projecting the arm of the driver laterally of the vehicle obviated and without interfering in any way with the operation of the vehicle in an ordinary manner.

Obviously, my invention is susceptible of embodiment in forms other than that described and illustrated in the accompanying drawing, and I therefore consider as my own, all such modifications and adaptations of the form herein shown, as fairly fall within the spirit and scope of the appended claim.

Obviously, no departure from the spirit and scope of the invention will be effected by the provision of any suitable known means for controlling the means for supplying current to the lamps 10 so that current will be supplied to the lamps only when the lamp carrying arms 7 and 8 are swung downwardly or the current may be supplied continuously to the lamp for any desired length of time.

What I claim is:—

A signaling device comprising a longitudinal tubular member, means for rotatably supporting the tubular member in position to extend longitudinally of a vehicle, similar signal arms at the opposite ends of said longitudinal tubular member, and extending substantially at right angles to the latter, incandescent lamps carried by the extremities of said signal arms, each of said incandescent lamps having the portions of the globes thereof proximate to the vehicle colored, conductors leading from said incandescent lamps through the longitudinal tubular member and adapted for connection with a suitable source of electric current supply and means for rocking the longitudinal tubular member to vary the angular relation of said signal arms to a horizontal plane.

DAVID ALEXANDER RITCHIE.